United States Patent Office 3,556,668
Patented Jan. 19, 1971

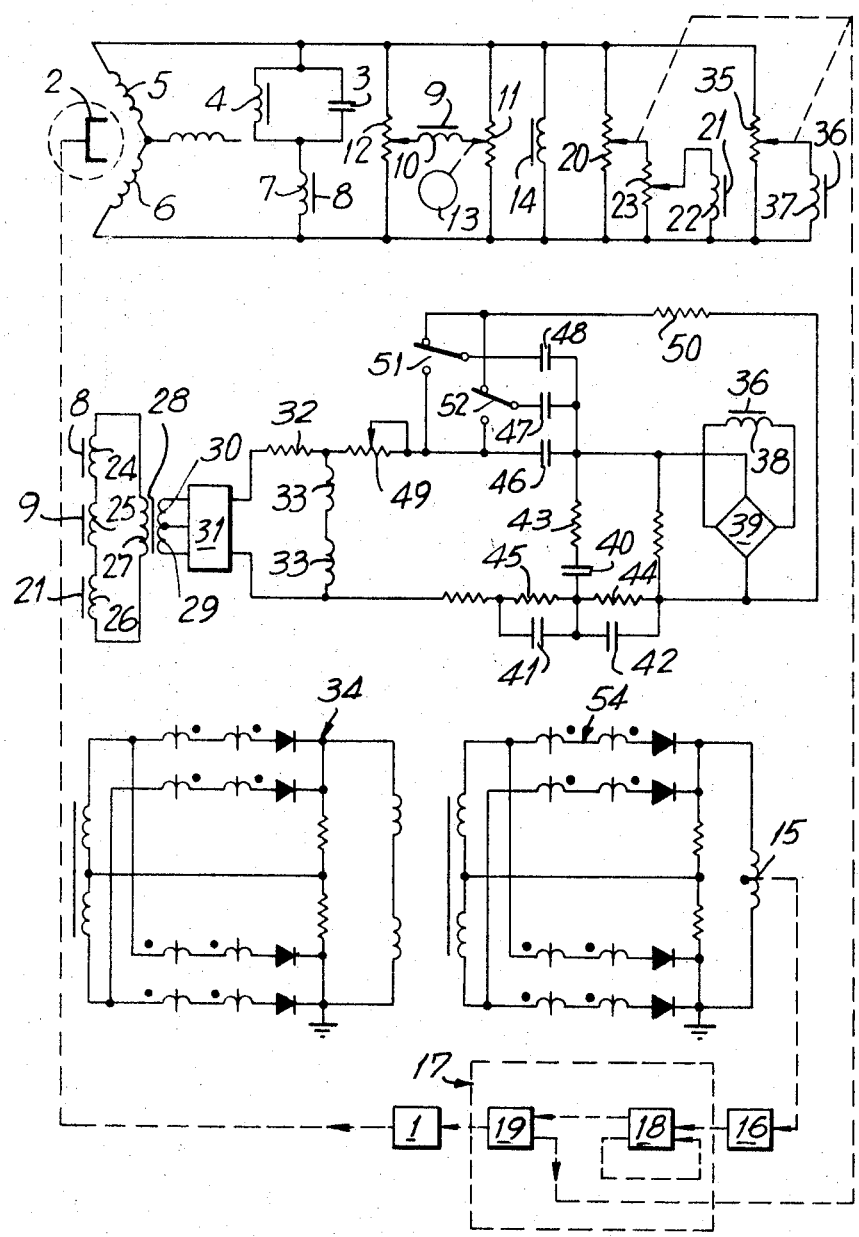

3,556,668
ELECTROHYDRAULIC SPEED CONTROLLER EMPLOYED IN HYDROTURBINES
Veniamin Anatolievich Marbukh, Veniamin Samuilovich Lychak, Lazar Ilich Paikin, Vladimir Alexeevich Matveev, Vasily Vasilievich Semenov, Emil Fedorovich Stepura, and Vasily Nikolaevich Fedorov, Leningrad, U.S.S.R., assignors to Leningradsky Metallichesky Zavod Imeni XXII Siezda KPSS, Leningrad, U.S.S.R.
Filed July 11, 1968, Ser. No. 744,131
Int. Cl. F15b *13/16;* H02p *5/00*
U.S. Cl. 415—10                                                                     1 Claim

ABSTRACT OF THE DISCLOSURE

An electrohydraulic speed controller for a hydroturbine comprises an electrical measuring unit coupled to a magnetic amplifier in turn coupled to a hydromechanical actuator via an electrohydraulic converter. The actuator includes a main servomechanism and an auxiliary servomechanism both adapted to vary the degree of opening of the gate apparatus of the hydroturbine. A proportional feedback and a PI-feedback are connected to the main servomechanism, and the PI-feedback incorporates a passive corrective network connected in series with the control windings of the magnetic amplifier. The passive corrective network includes a differentiating section, an integrating section and another differentiating section connected in series in the above order, all sections including RC elements.

---

The present invention relates to electrohydraulic speed controllers employed in hydroturbines in hydroelectric generating stations.

Known in the art are electrohydraulic speed controllers employed in hydroturbines operating on the principle of frequency, voltage and output power variations of the hydroturbine involved, said controllers comprising an electrical measuring unit, a hydromechanical actuator and a magnetic amplifier, all of these being acted upon by a PI-feedback. Additionally these controllers have their hydromechanical actuator provided with an electric motor.

A disadvantage of the conventional controllers resides in the fact that at high magnitudes of the PI-feedback (that is, of the feedback ratio $\beta$) required at a low coefficient of natural regulation of the load involved, the stable operation of the controller is attainable only due to a reduction of the amplification coefficient of the controller. This results in an increased dead zone of the controller. Moreover, an independent setting of the PI-feedback parameters (that is, the time constant T and the feedback ratio $\beta$ utilized in the conventional controllers, makes an optimum setting of the controller rather difficult which adversely affects the desired quality of regulation.

It is an object of the present invention to provide such an electrohydraulic speed controller employed in hydroturbines which is capable of substantially stable regulation at high magnitudes of the PI-feedback.

It is another object of the present invention to provide an electrohydraulic speed controller which features an optimum setting thereof.

The main object of the present invention resides in the fact that in an electrohydraulic speed controller employed in hydroturbines operating on the principle of current frequency and output power variations of the hydroturbine involved, said controller comprising an electrical measuring metering unit, a hydromechanical actuator and a magnetic amplifier, all of these being influenced by a PI-feedback coupled to the magnetic amplifier, according to the invention a passive correction network is inserted into the circuit of said PI-feedback in series with the control winding of the magnetic amplifier, said correction network incorporating a differentiating section, an integrating section and another differentiating section, said sections employing RC elements and being connected in series in the sequential order stated above.

It is expedient that at least one auxiliary capacitor (resistor-connected in the circuit of a PI-feedback), be connected in parallel with the capacitor of the second of said differentiating sections.

Other objects and advantages of the present invention will become evident from a consideration of an exemplary embodiment thereof given by way of illustration with reference to the accompanying drawing, wherein a principal block diagram of an electrohydraulic speed controller of the invention is represented.

Now referring to the drawing, an electrohydraulic speed controller of a hydroturbine 1 comprises an electrical measuring unit, a magnetic amplifier and a hydromechanical actuator. The electrical measuring unit incorporates a tachogenerator 2 connected to a resonance circuit employing RC elements 3 and 4. A primary winding 7 of a transformer 8 is connected to the windings 5 and 6 of the tachogenerator 2 in series with the above said resonance circuit.

The regulator features a circuit adapted to set the speed of idle rotation of the hydroturbine 1 said circuit incorporating a transformer 9 whose primary winding 10 is connected to potentiometers 11 and 12. A moving arm of the potentiometer 11 is adapted to be driven from an electric motor 13.

The magnetic amplifier is supplied from a transformer 14. The magnetic amplifier output is connected to a winding 15 of an electrohydraulic converter 16 adapted to associate the electrical measuring unit of the regulator with a hydromechanical actuator 17, the latter comprising an auxiliary servomechanism 18 and a main servomechanism 19, both being adapted to vary the degree of opening of the gate apparatus (not shown in the drawing) of the hydroturbine 1.

The regulator features a proportional feedback employing a potentiometer 20 mechanically connected to the main servomechanism 19, and a transformer 21 whose primary winding 22 is connected to the potentiometer 20 via a potentiometer 23, the latter being adapted to control the tightness of the proportional feedback.

Secondary windings 24, 25 and 26 of the transformers 8, 9 and 21 are respectively connected in series and are coupled to a primary winding 27 of a summing transformer 28 whose secondary windings 29 and 30 are connected to control windings 33 of a first stage 34 of the magnetic amplifier through a phase-sensitive rectifier 31 and a resistor 32.

The herein-disclosed speed regulator likewise features a PI-feedback employing a potentiometer 35 mechanically connected with the main servomechanism 19, and a transformer 36 whose primary winding 37 is connected to the potentiometer 35. A secondary winding 38 of the transformer 36 is connected through a rectifying circuit 39 and the passive correction network to the control windings 33 of the first stage 34 of the magnetic amplifier. Thus, the passive corrective network is inserted into the PI-feedback circuit in series with the control windings of the magnetic amplifier. The aforesaid network comprises the series connection of the following elements in the stated sequential order a differentiating section, an integrating section and another differentiating section, the integrating section and the first of said differentiating sections being essentially an integral differential network incorporating capacitors 40, 41 and 42 and resistors 43, 44 and 45.

The second of said differentiating sections comprises capacitors 46, 47 and 48 and a resistor 49. The capacitors 47 and 48 being connected to the rectifying circuit 39 via a resistor 50 and changeover switches 51 and 52.

The herein-disclosed speed controller operates as follows.

The idle speed of rotation of the hydroturbine is set by the potentiometer 12 the signal from which is applied to the primary winding 9 of the transformer 10. Then the abovesaid signal is supplied through the summing transformer 28, the phase-sensitive rectifier 30 and the additional resistor 32, to the control winding 33 of the first stage 34 of the magnetic amplifier and further on, to the second stage 54 of said magnetic amplifier. Thereupon the signal from the output of the stage 54 is delivered to the coil 15 of the electrohydraulic converter 16 adapted to convert an electric output signal into a proportional mechanical pulse available at the output thereof.

The abovesaid mechanical pulse is then power-amplified by the auxiliary servomechanism 18 operable by virtue of a proportional feedback, and is applied to the control valve of the main servomechanism 19 which is capable of varying the degree of opening of the gate apparatus of the hydroturbine 1.

The aforementioned resonance circuit is essentially a frequency-sensitive element and is so tuned that at the nominal frequency involved, the signal appearing from the secondary winding 7 of the transformer 8 equals zero. When the frequency involved changes, the signal from the transformer 8 is applied to the summing transformer 28. Depending upon the sign of the abovesaid signal the gate apparatus of the hydroturbine 1 opens or closes.

The change in position of the gate apparatus causes the moving arm of the potentiometer 35 employed in the PI-feedback and connected to the abovementioned gate apparatus, to move with the result that the signal available from the secondary winding 38 of the transformer 36 changes. Thereupon the signal is supplied via the rectifying circuit 39, the capacitor 46, the resistor 49 and the integral differential network to the winding 33 of the first stage 34 of the magnetic amplifier.

Such a cutting in of the correction network provides the possibility to concurrently vary the parameters of the PI-feedback, i.e., the time constant T and the feedback ratio $\beta$ while their product remains constant. For general-purpose setting of the herein-disclosed speed controller, provision is made for the changeover switches 51 and 52 of the capacitors 47 and 48 to vary the product of the values T and $\beta$, with the value B remaining constant.

The precharging of the capacitors 47 and 48 effected through the resistor 50 makes it possible to obviate the unnecessary deviations in the regulating system when the parameters involved in setting of the speed controller are varied.

In the herein described speed controller, at low values of the PI-feedback ratio, a possibility arises to substantially diminish the controller dead zone, whereas at high values of that coefficient a stable regulation is possible with the controller sensitivity remaining constant.

What is claimed is:

1. An electrohydraulic speed controller employed in hydroturbines, operating on the principle of current frequency and output power variations of the hydroturbine involved, comprising an electrical measuring unit; a magnetic amplifier coupled with said electrical measuring unit, said magnetic amplifier including a control winding; a hydromechanical actuator connected to said magnetic amplifier; a PI-feedback circuit coupled to said magnetic amplifier; and a passive correction network inserted into said PI-feedback circuit in series with the control winding of said magnetic amplifier and comprising connected in series and in the following sequential order a differentiating section, an integrating section and another differentiating section, all of these sections including RC elements.

References Cited
UNITED STATES PATENTS

| | | | |
|---|---|---|---|
| 3,097,490 | 7/1963 | Callan | 60—73 |
| 3,288,160 | 11/1966 | Eggenberger | 137—27 |
| 3,342,195 | 9/1967 | Wagner | 137—36X |

CLARENCE R. GORDON, Primary Examiner

U.S. Cl. X.R.

91—366; 317—5